US007483028B2

(12) United States Patent
Wong et al.

(10) Patent No.: US 7,483,028 B2
(45) Date of Patent: Jan. 27, 2009

(54) PROVIDING 1D AND 2D CONNECTORS IN A CONNECTED DIAGRAM

(75) Inventors: Karen K. Wong, Seattle, WA (US); David Gerton, Seattle, WA (US); Ilan Berker, Seattle, WA (US); Ramona Pousti, Redmond, WA (US); Matthew J. Kotler, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 13 days.

(21) Appl. No.: 11/287,698

(22) Filed: Nov. 28, 2005

(65) Prior Publication Data

US 2006/0209085 A1    Sep. 21, 2006

Related U.S. Application Data

(63) Continuation-in-part of application No. 11/081,211, filed on Mar. 15, 2005, now Pat. No. 7,253,823.

(51) Int. Cl.
*G06T 11/20* (2006.01)
*G09G 5/00* (2006.01)
*G06F 3/048* (2006.01)

(52) U.S. Cl. .................. 345/440; 345/441; 345/619; 715/853

(58) Field of Classification Search ............ 345/440, 345/441, 443, 619, 418; 715/853, 763, 788, 715/517, 713, 764, 712, 855
See application file for complete search history.

(56) References Cited

U.S. PATENT DOCUMENTS

| 5,555,357 | A  | * | 9/1996 | Fernandes et al. | ........... 345/441 |
|-----------|-----|---|--------|------------------|-------------------|
| 6,225,998 | B1 | * | 5/2001 | Okita et al. | ................. 715/853 |
| 6,449,761 | B1 | * | 9/2002 | Greidinger et al. | ............ 716/11 |
| 2003/0098880 | A1 | * | 5/2003 | Reddy et al. | ................. 345/763 |
| 2005/0039145 | A1 | * | 2/2005 | Diering et al. | ............... 715/853 |

OTHER PUBLICATIONS

Penston, George, "The Creative Toolbox: FreeHand MX Integrates and Innovates", www.creativepro.com, pp. 1-7, Apr. 15, 2003.*
Neuburg, Matt, "TidBITS; Make the Connection with ConceptDraw", www.tidbits.com, pp. 1-6, Oct. 2000.*
"Cutedraw: Vector-Based Graphic Software", pp. 1-4, 2007, http://www.cutedraw.com.*

* cited by examiner

*Primary Examiner*—Chante Harrison
(74) *Attorney, Agent, or Firm*—Merchant & Gould

(57) ABSTRACT

Dynamic routing of 1D and 2D connectors is provided in a connected diagram. 2D connector shapes, end-shapes, content such as text or images are dynamically adjusted as objects are placed onto the diagram canvas. Connection points for connectors are determined using cardinal points, shortest distance between objects, or by generating additional cardinal points with a virtual object. Connectors are routed using a boundary box placed between cardinal points and a relationship between imaginary vectors pointing away from the objects at the connection points.

20 Claims, 11 Drawing Sheets

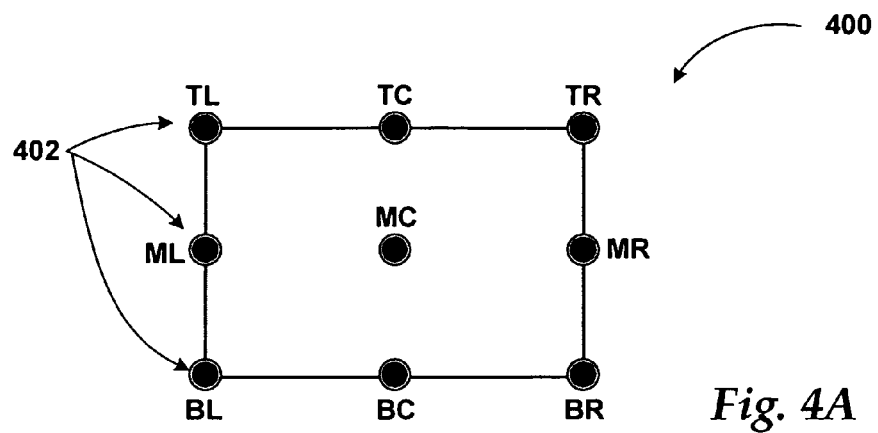
*Fig. 4A*
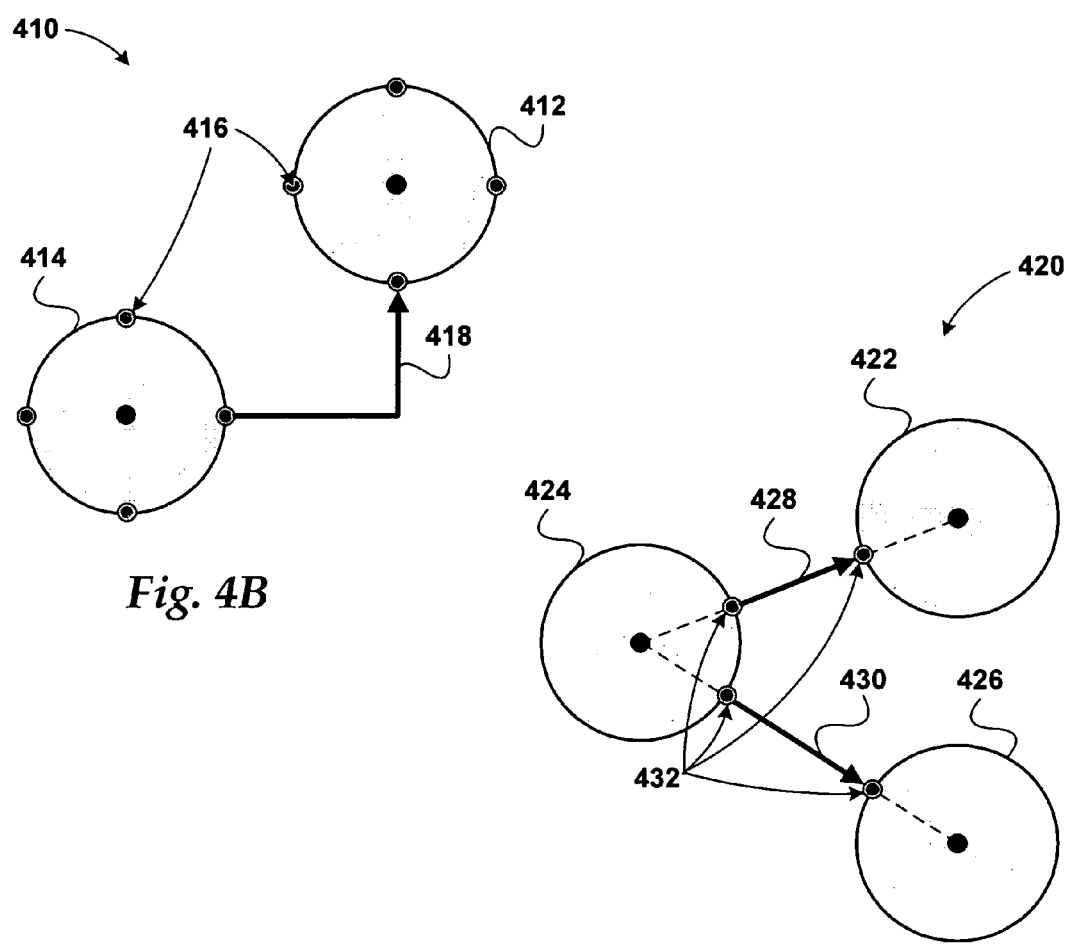
*Fig. 4B*
*Fig. 4C*

PROVIDING 1D AND 2D CONNECTORS IN A CONNECTED DIAGRAM

RELATED APPLICATIONS

The present application is a continuation-in-part of U.S. patent application Ser. No. 11/081,211, filed Mar. 15, 2005, and claims the benefit of the earlier filing date under 35 U.S.C. § 120. The parent application is hereby incorporated by reference.

BACKGROUND

Connected diagrams graphically present relations between elements. For example, organizational structures, network structures, and the like may be visually represented by a connected diagram. Connectors are one of the primary ways of visually representing transitions and relationships in diagrams. Connectors are lines or shapes that connect objects together, and then stay attached even after the objects are rearranged. Some graphical applications also employ 2D connectors such as 2D arrows. Connection sites are the locations on an object where connectors attach. In many graphical applications 2D connectors are either not supported at all, or supported with limited connection capability. This forces users to frequently re-position and re-align 2D shapes to create a connected diagram with 2D connectors.

While some software programs include features such as smart connection, where a connector between two objects of the diagram may be modified in size and shape when the objects are moved, most applications are limited in providing automated connection that can reflect relations between objects as well as additional information in an aesthetic manner. Most notably, creating diagrams with curved connectors (especially 2D connectors) is difficult to achieve with the available tools today.

SUMMARY

One dimensional (1D) and two dimensional (2D) connectors are provided in a connected diagram dynamically linking objects. Connectors through their shape, content, and connection style provide additional information about a relation between the objects.

According to some aspects, a shape, a size, an end-shape, and content properties of 2D connectors are dynamically modified according to a change of the shape or the size of the connector. Furthermore, content and content properties of a 2D connector may be preserved when the 2D connector is switched to a 1D connector by user action.

Connection points for connectors are determined using cardinal points, shortest distance between objects, or by generating additional cardinal points with a virtual object. Connectors may be routed using a boundary box placed between cardinal points and a relationship between imaginary vectors pointing away from the objects at the connection points.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4A is a diagram illustrating an example object with predetermined connection points according to a further embodiment;

FIG. 4B is a diagram illustrating a routing of a 1D connector between two example objects according to one routing method;

FIG. 4C is a diagram illustrating routing of two 1D connectors between three example objects according to another routing method;

DETAILED DESCRIPTION

Embodiments of the present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Illustrative Operating Environment

Figure 1:
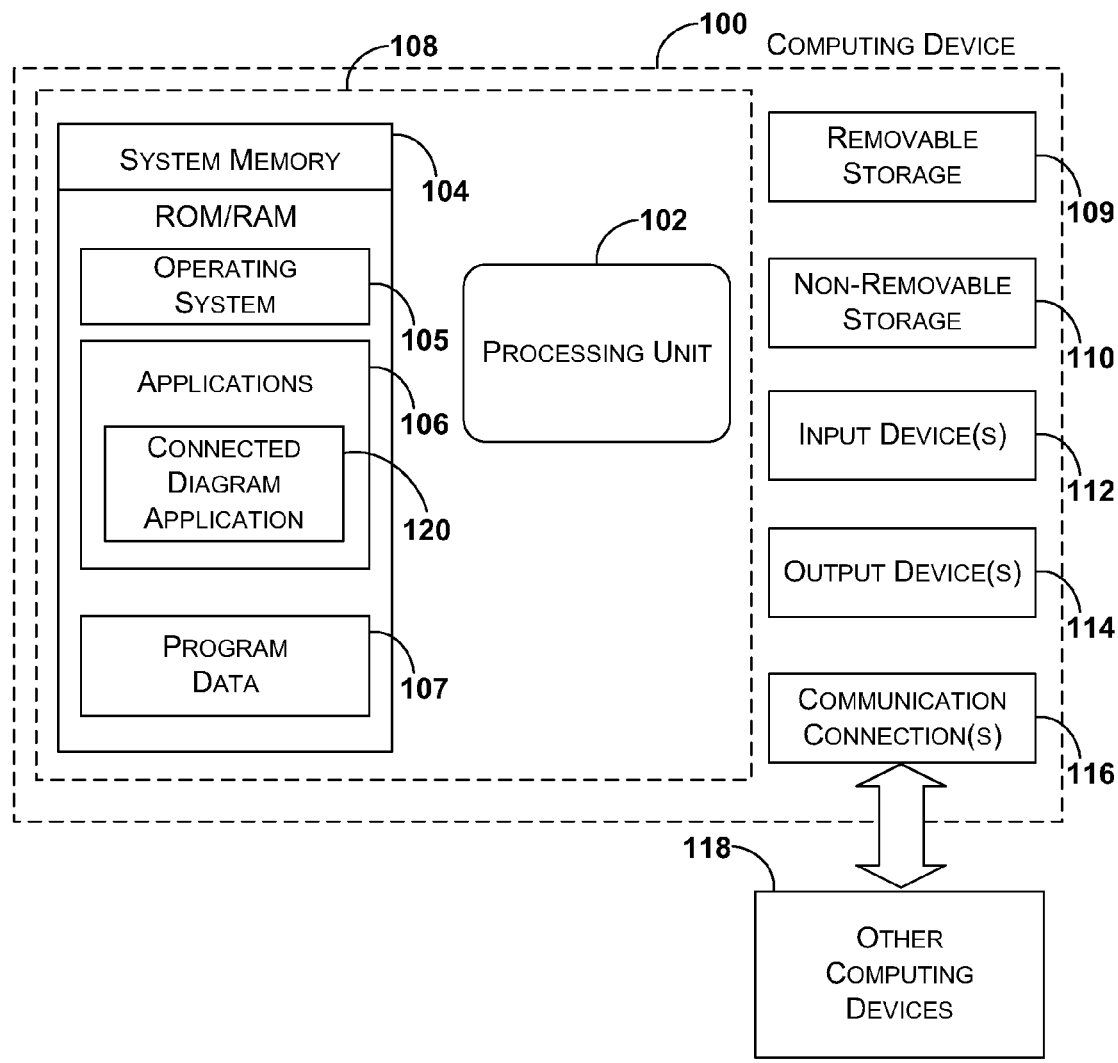
FIG. 1 illustrates a computing device that may be used according to an example embodiment.

Referring to FIG. 1, an example system includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

In one embodiment, applications 106 further include diagram application 120, which is arranged to create a graphical representation of user provided relational data employing objects and connectors. Diagram application 120 may receive information associated with object and connector definitions, object relations, and object and connector properties from a user, one or more databases, or a combination of the two. User input may be provided through input device 112 or communication connection 116. The one or more databases may be stored in one of the storage devices of computing device 100, or in a remote storage device (not shown). Diagram application 120 may provide an output, which is typically a graphics file or another file containing the generated graphics to output device 114, one of the storage devices, or to an external device, such as a networked printer, through communication connection 116.

Illustrative Embodiments for Providing Connectors in a Connected Diagram

Embodiments of the present invention are related to providing 1D and 2D connectors in a connected diagram. According to one embodiment, routing and layout of connectors is accomplished by employing specific properties associated with a connector. The properties include a pre-defined set of behaviors for the connector that enable an aesthetic layout. The properties may have pre-defined default values for each connector designation. Moreover, a user may be able to control routing behaviors and visual look of the connectors within a diagram.

Users can switch between 1D and 2D connectors regardless of a routing of the connector (straight, elbow, curved, etc.). Padding and offset features may be assigned to connectors for aesthetically pleasing presentation of object relations. Text box shapes and placements on or near connectors may be modified depending on connector type, size, and placement. Images and non-predefined shapes may be used as connectors with smart behaviors assigned similar to predefined shapes. In addition to fixed connection points on objects, auto or radial connection styles may be used, enabling more aesthetically pleasing presentation of connections. Furthermore, any combination of connector shapes and connection paths such as straight connectors on radial paths may be employed.

Figure 2:
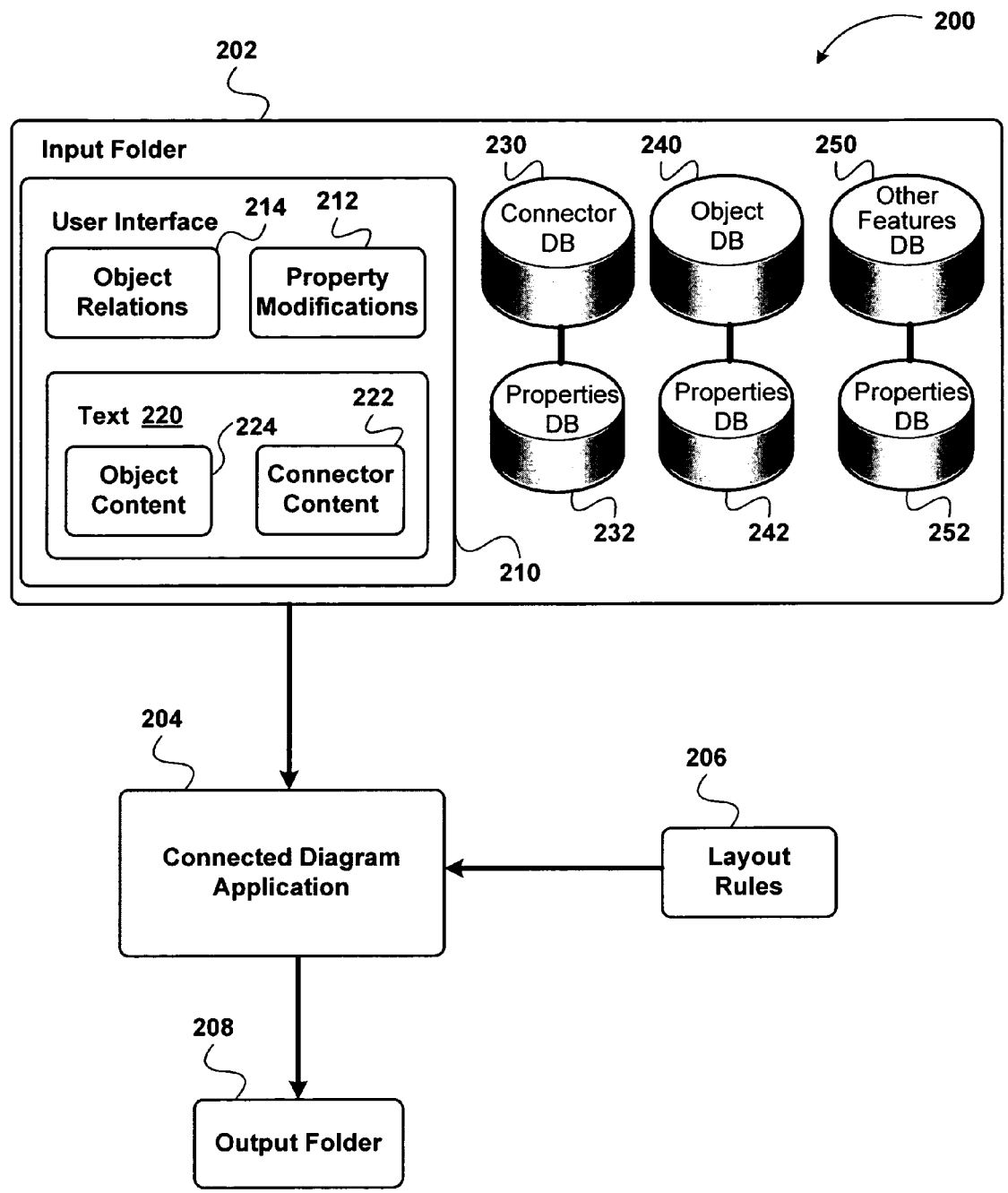
FIG. 2 illustrates a functional block diagram of a software program arranged to provide objects and connectors for a connected diagram including a diagram application and associated blocks.

FIG. 2 illustrates functional block diagram 200 of a software program arranged to provide objects and connectors for a connected diagram including a diagram application and associated blocks. Functional block diagram 200 includes input folder 202, diagram application 204, layout rules 206, and output folder 208. Diagram application 204 may be executed in a computing device such as computing device 100 of FIG. 1.

Diagram application 204 is arranged to receive a number of inputs ranging from objects and connectors to object relations, and to generate a graphical representation of the connected diagram using layout rules 206. The generated representation is then provided to an output folder. The representation may be provided in form of a file or group of files such as a graphics file or an HTML web page. The file or group of files may then be presented to a user in an output device such as a computer monitor, a printer, and the like.

Layout rules 206 may be a file, a database, or any other medium that is arranged to store default rules for laying out objects and connectors. As such, layout rules 206 may be maintained in a hard disk within the same computing device as diagram application 204, in a remote computing device that is in communication with the device running diagram application 204, and the like. Once diagram application 204 receives applicable default rules from layout rules 206, it may modify constraints associated with the connectors such as padding etc. to determine an aesthetically pleasing layout. In another embodiment, the modification may be based on user input.

Input folder 202 is a functional block that includes the information provided to diagram application 204 for laying out the diagram. Part of the information may be provided by the user through user interface 210. User interface 210 may include any type of input device such as a keyboard, and also other methods of providing information such as network communications from another computing device, and the like.

One category of information provided by the user is object relations 214. The user may provide object relations 214 in a text-based file such as an XML file, by selecting among available options in a User Interface (UI), etc. Object relations 214 define connections between elements of the connected diagram. For example, to generate an organizational chart, the user may provide hierarchical relations between members of an organization.

Another category of information includes property modifications 212. As described below, objects, connectors, and other features of the connected diagram may have default properties. The user may be provided an opportunity to modify these properties for individual elements or groups of elements. Changing font type, size, and color of connector text boxes individually or for all connectors is an example of property modifications 212.

A further category of information provided by the user is text 220. Text 220 includes object content 224 and connector content 222. In the example of organizational chart, names of the organization members constitute object content 224. In one embodiment, object relations 214 may be inferred from a structure of object content 224. For example, in a text file format each line separated by a hard return may correspond to an object of the same hierarchical level. Lines beginning with one or more tabs may correspond to lower hierarchical levels depending on the number of tabs.

Connector content 222 may be provided similarly to object content. Connector content may also include text, images, and other shapes. For example, in a decision tree diagram, connector content may include "YES" and "NO" for outcomes of decision blocks. Connector content 222 may also be provided one at a time as each connector is generated in the connected diagram by typing onto the canvas.

In addition to the user provided information, input folder 202 may include databases and/or fields for default information. These may include connector database 230, object database 240, and other features database 250. Connector database 230 and object database 240 may include predetermined types of connectors and objects such as 1D and 2D connectors of various shapes, predefined object shapes, and the like. Both of these databases may be associated with a properties database of their own. Properties databases 232 and 242 may include information associated with individual objects and connectors of the respective databases. For example, properties database 232 may include default information for stem length, beginning and end-shape, text box position and shape information for 1D and 2D connectors. In another embodiment, properties database 232 may include information associated with any customization and other changes to the properties of the 1D and 2D connectors.

The properties databases are provided for illustration purposes and property information associated with objects and connectors do not have to be stored in separate databases. In one embodiment, the property information may be stored as a set of parameters in an XML definition file for the object or connector. In such an embodiment, a name of the connector calls default parameters for the connector such as size, orientation, and the like. While object, connector, and other features information may be provided in a pre-packaged format, the user may be enabled to add, delete, or modify part or all of this information in addition to having the ability to modify individual elements as the diagram is being generated. The last category, other features database 250 and its properties database 252 represent information associated with other features of the diagram such as canvas background, canvas size and shape, display device specific characteristics (e.g. landscape vs. portrait layout), and the like.

Categories of input information and their groupings as well as output categories provided here are not intended to constitute a limitation on the present disclosure. Embodiments may be implemented with fewer or additional categories, as well as with other grouping of these categories without departing from the scope and the spirit of the invention.

Figure 3:
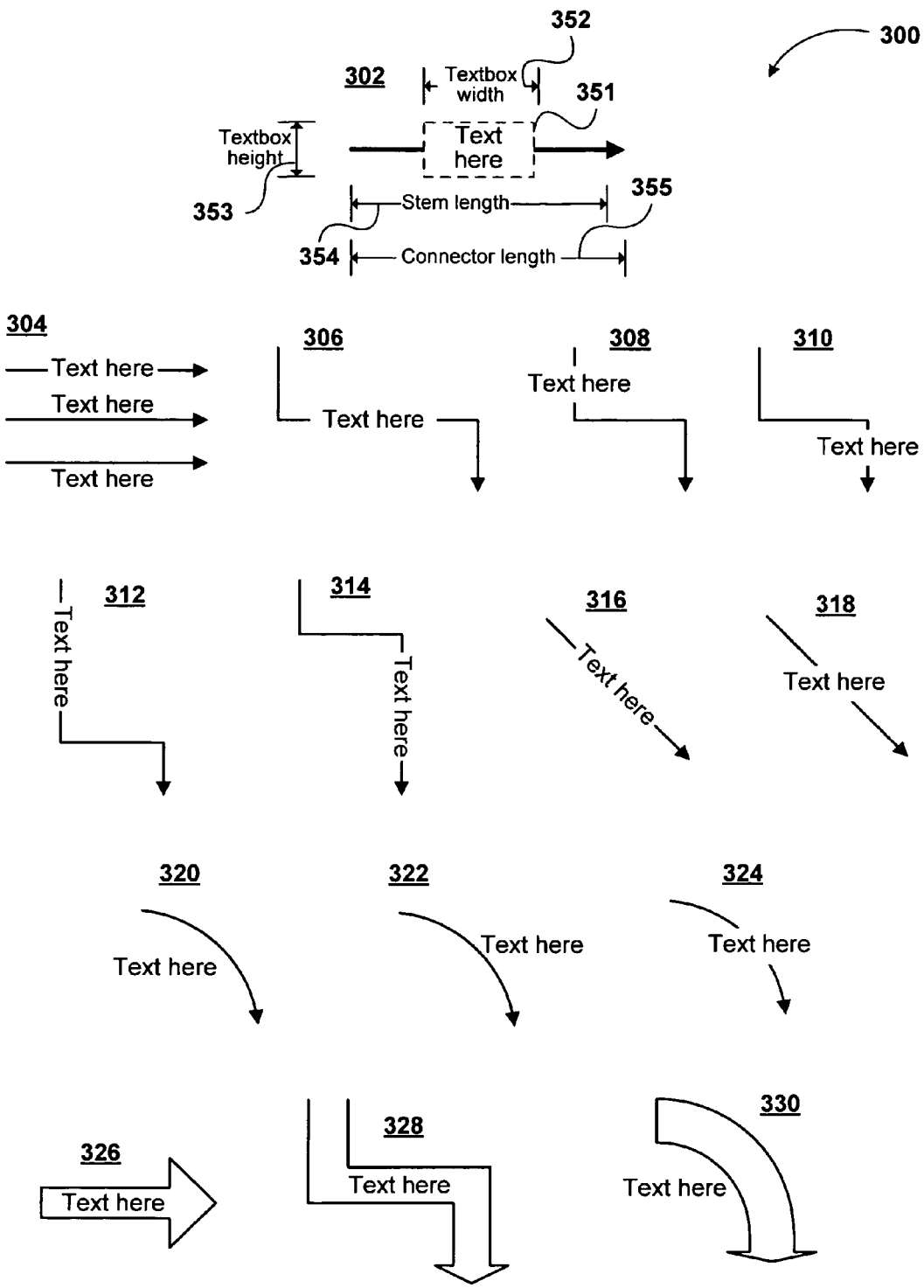
FIG. 3 illustrates various examples of 1D and 2D connectors with their associated text according to another example embodiment.

FIG. 3 illustrates various examples 300 of 1D and 2D connectors with their associated text according to an example embodiment. Examples 300 include 1D connector 302 with its properties. 1D connector 302 is illustrated in an arrow shape. However, beginning and end-shapes of connectors are selectable among a number of available shapes such as filled circles, empty circles, squares, and the like. As shown in the figure, 1D connector 302 includes text box 351 at about its center as a default position. Text associated with 1D connector 302 may be presented in text box 351. While center of 1D connector 302 is a default position for text box 351, other positions including above or below the connector, shifting towards either end of the connector are among user-selectable or per-diagram properties.

Furthermore, width 352 and height 353 of text box 351 may be determined either by default, automatically depending on a size of the text, or by user definition or per-diagram. Stem length 354 and beginning and end-shape sizes of 1D connector 302 are also properties that may be modified by the user. Moreover, a stem thickness may also be modified by the user or per-diagram. In one embodiment, characteristics of the text within text box 351 such as character size, spacing, and the like may be automatically determined based on stem length 354 of 1D connector 302. Connector length 355 is a sum of stem length 354 and lengths of beginning and end-shapes (if any) of connector 302.

Diagram application may be enabled to place the text, as well as provide connector properties to create aesthetic fitting and rendering of the text on the connector. For example, users can specify for elbow connectors, which segment of the connector to place their textbox.

1D connector 302 shows default text box placement and connector properties for a 1D connector. For a 2D connector, text box placement and connector properties are similar. In addition to the above discussed properties of a 1D connector, connector height and beginning and end-shape height are among additional properties for a 2D connector.

In fact, a diagram application (e.g. 204 of FIG. 2) according to one embodiment provides a user the ability to switch between 1D and 2D connectors while preserving connector properties. Another aspect of the present disclosure provides for automatic routing of a 1D connector to avoid the text box. That way, the text box may have a transparent background and let the background color of the graphic canvas show through. This feature is referred to as "text avoidance". In many diagram applications text boxes have their own default background color, which may not necessarily match the graphic canvas color. By avoiding the text box, an aesthetically pleasing effect is created directing a viewer's focus on the objects as opposed to the connectors.

Example 304 shows three embodiments of a straight, arrow shaped, 1D connector with different text box placements. As mentioned above, the text box may be placed above, under, or on top of the 1D connector. In one embodiment, a predetermined offset from the center position may be provided based on user selection.

Examples 306, 308, and 310 show three versions of an elbow shaped 1D connector. Based on user selection, the text box may be placed on any of the segments of the elbow shaped 1D connector.

Examples 312 and 314 show two more elbow shaped connectors with the text box rotated to align with the connector stem. In another embodiment, the box may be place at a predetermined angle with respect to the stem of the 1D connector.

Examples 316 and 318 illustrate text box placements on a 1D connector with an angle. By default the text box may be placed at the same angle as the connector or at a different angle such as horizontal regardless of the angle of the 1D connector.

Another feature of a diagram application according to the present disclosure includes curved connectors. Placement of the text box may again be under, on top of (example 320), or above (example 322) the connector. The text box may also be kept in straight format, as shown in example 324, with a user selected angle to the connector.

Examples 326, 328, and 330 show a straight, an elbow shaped, and a curved 2D connector with their respective text boxes. All of the above discussed text box placements and shapes are applicable to 2D connectors as well.

While specific examples of connector shapes, text box placement and shapes are shown here, the invention is not so limited. Other connector shapes, text box shapes and placements may be implemented without departing from the scope and spirit of the invention. In fact, in one embodiment, user defined shapes and placement options may be implemented automatically by the diagram application.

FIG. 4A illustrates example object 400 with predetermined connection points. According to one embodiment, three routing methods are employed for connectors. The first method uses fixed connection points (also called "cardinal" points) on an object (See FIGS. 4B, 6A, and associated discussions). The second method (also called "auto" connection) draws an imaginary straight line between the center points of two objects to be connected. A connector is then placed between the intersection points of each object and the imaginary straight line (See FIG. 4C and associated discussion). The third method (also called "radial" connection) places a connector along a circumference of a circle that crosses the center points of the objects to be connected (See FIG. 5B and associated discussion).

In accordance with the first method, an object includes cardinal connection points that are predefined for each type of object. Example object 400 includes nine such connection points 402. The connection points may be named geographically depending on the object type. For a square or rectangular object the nine connection points may include: top-left (TL), top-center (TC), top-right (TR), middle-left (ML), middle-center (MC), middle-right (MR), bottom-left (BL), bottom-center (BC), and bottom-right (BR).

In contrast to the "auto" method, if a connector is assigned MC as connection point, it does cross over the body of the object to reach cardinal point MC, whereas in "auto" routing the connector is drawn only to touch an outer edge of the object.

FIG. 4B includes diagram 410 illustrating a routing of a 1D connector between two example objects according to cardinal points routing method.

As described above, example objects 412 and 414 include five cardinal points 416 each (top, bottom, left, right, and center). Connector 418 is assigned to be routed between right cardinal point of object 414 and bottom cardinal point of object 412. Based on a predefined connector type (elbow shaped), an L-shaped connector is placed between the two selected connection points.

According to another embodiment, the smart connection feature of a diagram application may modify connection point selection if objects are rearranged. Such auto selection may be performed employing a number of prioritized rules such as shortest distance, least number of connector segments, best fit of connector text, and the like. When objects are rearranged, the application may determine alternative selection point pairs and apply the rules to select a connection point pair that best fits the rules. Then a new connector may be drawn between the new pair of connection points.

In a further embodiment, the user may be enabled to choose between alternative routings according to the above described methods and the connector placed based on the user choice.

FIG. 4C includes diagram 420 illustrating routing of two 1D connectors between three example objects according to auto routing method. According to the auto routing method, imaginary straight lines are drawn between center points of objects 422, 424, and 426. "Auto" connection points 432 are then determined as intersection points of the objects and the imaginary lines (along the circumference of the circles in this case). Connectors 428 and 430 are placed between the "auto" connection points along the imaginary lines.

Figure 5A:
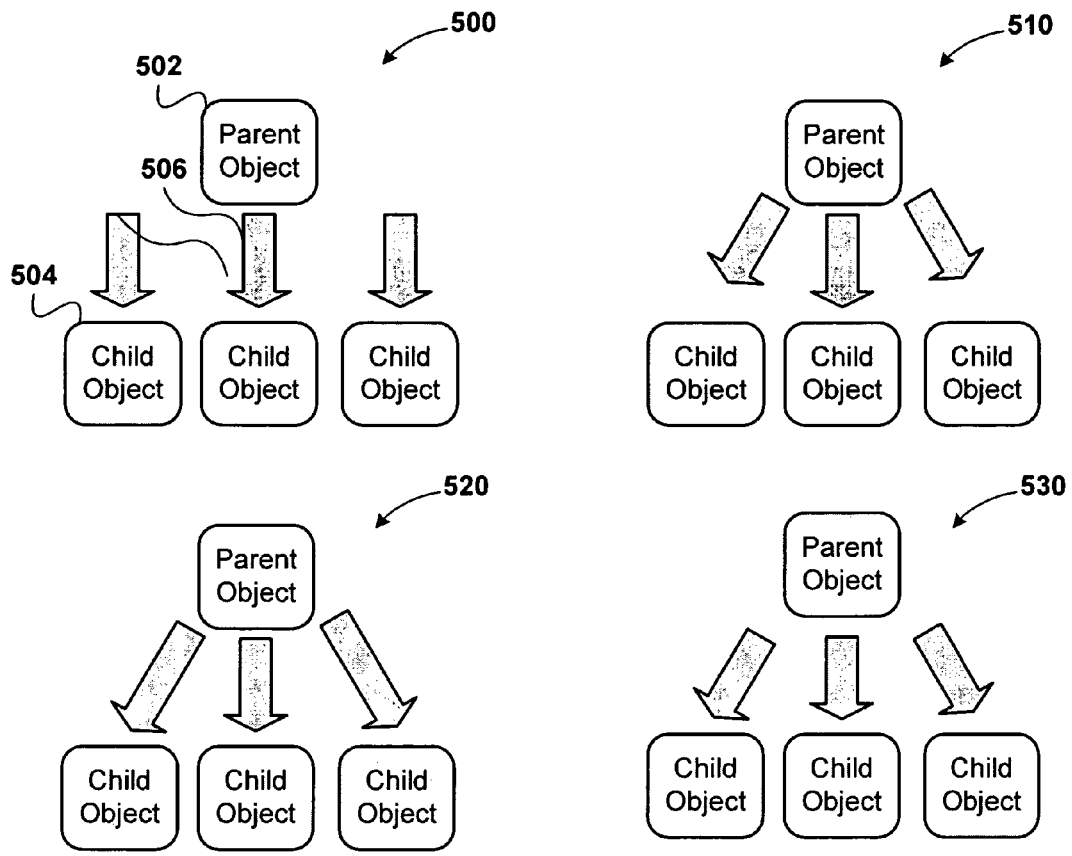
FIGS. 5A illustrates example layouts of 2D connectors between multiple objects according to an example embodiment.

FIG. 5A illustrates example layouts 500, 510, 520, and 530 of 2D connectors between multiple objects according to an example embodiment. As discussed previously, a user s enabled to select among a variety of object and connector placement options to fit their need. Graphical presentations may be more effective if object and connector layout fits a purpose of the presentation.

Example layout 500 shows parent object 502 that is hierarchically related to child objects (e.g. 504), which are all at the same hierarchical level. To convey a sense of equality and order, connectors (e.g. 506) are arranged to be equally sized and spaced in a vertical position.

Example layout 510 illustrates the same hierarchical relation between parent object and child objects with equally sized connectors that are spaced with the same distance from the parent object. A length equality alignment forces connectors to be of same length despite the distances between connecting objects increasing as number of child objects increases.

Example layout 520 shows the same relation without length equality alignment. In this case, the lengths of the individual connectors changes along with the distance between the connecting objects maintaining a constant distance between the beginning and end points (edges) of the connector and the objects it connects.

Finally, example layout 530 shows another version of length equality alignment. While the connectors (the same size) are equally distanced from the parent object in example layout 510, in example layout 530, they are equally distanced from both their parent and their associated child objects. Thus, a user can determine from available selections or graphical definition files may specify whether the connectors should be equal sized, how they should be placed, and if they should be equal distanced from a source object or a target object. In one embodiment, other options such as equal distance from an arbitrary point may be provided to the user for selection. Once the user makes a selection for the property, any new relations may be represented using the same selection by the diagram application.

Figure 5B:
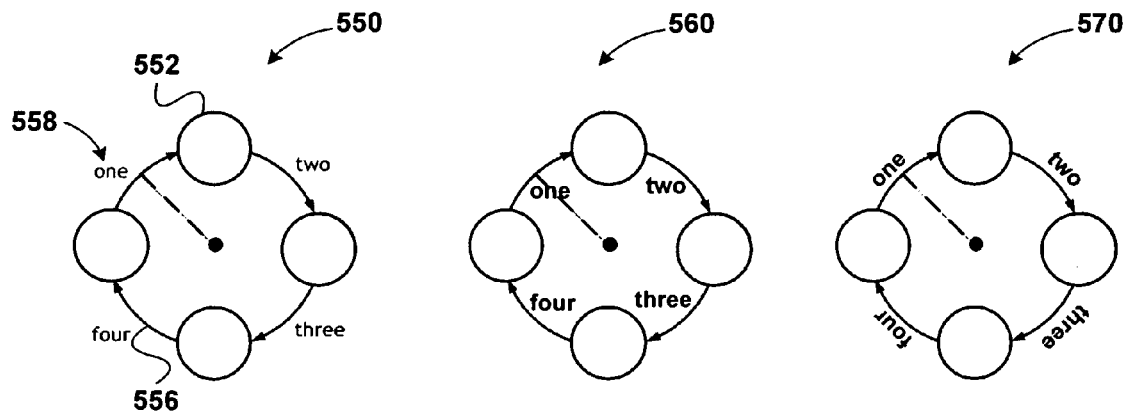
FIGS. 5B illustrates example layouts of 1D connectors between multiple objects according to another example embodiment.

FIG. 5B illustrates example layouts 550, 560, and 570 of 1D connectors between multiple objects according to another example embodiment.

As mentioned before, other shapes of connectors as well as connection types are provided as well. Instead of a parent-child hierarchy, the objects in a diagram may represent a circular relationship. The most appropriate connection style for such a diagram may be a radial connection using curved connectors. Peer objects (e.g. 552) of example layout 550 are connected with curved connectors (e.g. 556). In example layout 550, text boxes (e.g. 558) of connectors (e.g. 556) are placed horizontally regardless of a direction of the individual connectors.

Example layout 560 shows the same structure with text boxes also aligned with the connectors such that the text is inside the circle. In a curved routing method the connector is placed between two intersection points of an imaginary circle that crosses the center points of the two objects and two closest borders of the two objects. Example layout 570 shows the same structure with text boxes aligned with the curved connectors. This results in some of the text (three and four in the example) being up side down. Again, depending on a style and purpose of the presentation one of these configurations may be more appropriate than the others and selected by the user.

As in FIG. 3, the examples of connector and object placements and shapes provided here do not constitute a limitation on the present invention. Other embodiments may be implemented using different placements and shapes of connectors as well as objects without departing from the scope and spirit of the invention.

Figure 6A:
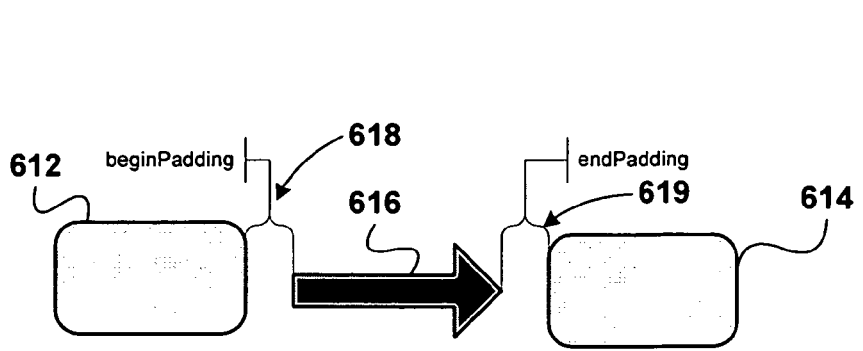
FIG. 6A illustrates one embodiment of padding of a 2D connector between two example objects.

FIG. 6A includes diagram 610 showing one embodiment of padding of a 2D connector between two example objects. Objects 612 and 614 are connected by 2D connector 616. Beginning padding value 618 (beginPadding) and end padding value 619 (endPadding) are assigned to 2D connector 616.

Padding is a property assigned to each connector according to one aspect of the present disclosure. It enables the user to insert a predetermined space between the beginning or the end of the connector and the connection points of the object. If a zero value is assigned to both beginning padding and end padding, the connector touches both connection points. If any other value is assigned, space corresponding to that value is inserted between the connector and the connection point. Once padding values are assigned, they may be preserved, even if the objects are moved and different connection points are selected following smart selection process. In one embodiment, padding may be determined such that it is equal across a set of shapes.

Figure 6B:
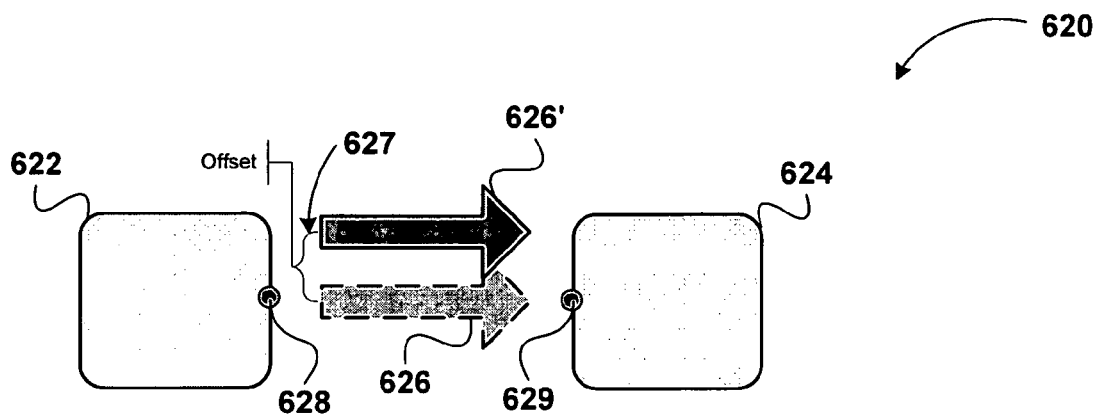
FIG. 6B illustrates one embodiment of offset of a 2D connector between two example objects.

FIG. 6B includes diagram 620 showing one embodiment of offset of a 2D connector between two objects as an example of customization by a diagram application according to one embodiment. Objects 622 and 624 may be connected by 2D connector 626, which is placed between connection points 628 and 629. In another embodiment, a default-determined or a user-selected offset value may be assigned to the connector resulting in connector 626' that is shifted from the original placement by offset 627 (Offset). Offset property may be preferred in diagrams where text within an object is not centrally aligned or does not completely fill the object. For example, if each object in a diagram includes text that is placed in the upper half of each object, providing an offset to the connectors such that the connectors are aligned with the text may be aesthetically more pleasing.

Figure 6C:
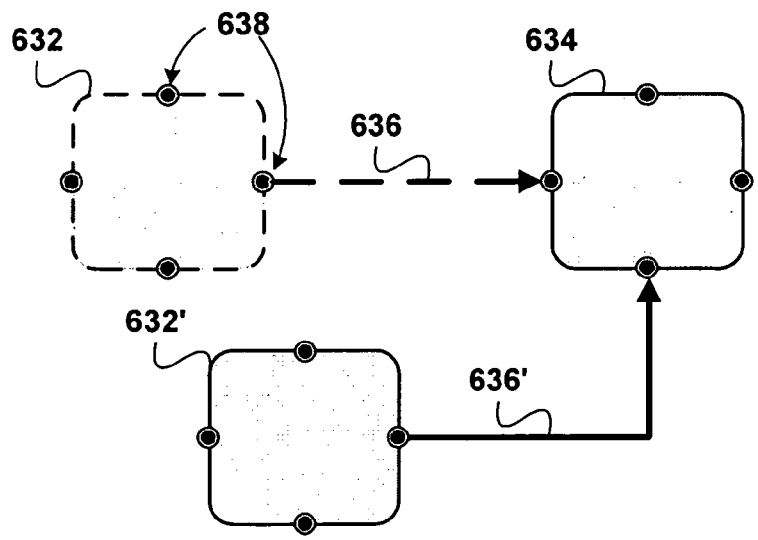
FIG. 6C illustrates one embodiment of smart selection of connection points for a 1D connector between two example objects.

FIG. 6C includes diagram 630 showing one embodiment of smart selection of connection points for a 1D connector between two example objects. Smart selection of connection points is discussed in more detail in conjunction with FIGS. 4A-4C above. Diagram 630 is another example of implementing smart selection for two objects where moving one object may change a shape of the connector.

Objects 632 and 634 are initially connected through straight connector 636 between a middle-right (MR) connection point of object 632 and middle-left (ML) connection point of object 634. When object 632 is moved to a lower position with respect to object 634 and becomes 632', a preferred connection point changes on object 634 from ML to bottom center (BC). Accordingly, straight connector 636 becomes elbow shaped connector 636' connecting MR of object 632' and BC of object 634.

Rules for selection of preferred connection points may be provided to a diagram application from a rules database, field, or definition file such as layout rules 206 of FIG. 2. In one embodiment, default rules such as shortest distance, least number of connector segments, and the like may be prioritized or eliminated by the user such that the new selection reflects the user's preference. In another embodiment, the application may present the user with alternative connection methods for each modification that may include alternative connector types, connection points, and the like such that the user can select the new connection layout.

Any sub-set of connection sites from the set of available ones on any given object may be specified as the set of preferred connection points to choose from. For example, not all rectangles need to use all cardinal sites as preferred connection sites for routing. A sub-set of those available may also be used. In a further embodiment, placement and shape of text boxes on the affected connectors may be modified according to default rules or user selections.

Figure 7:
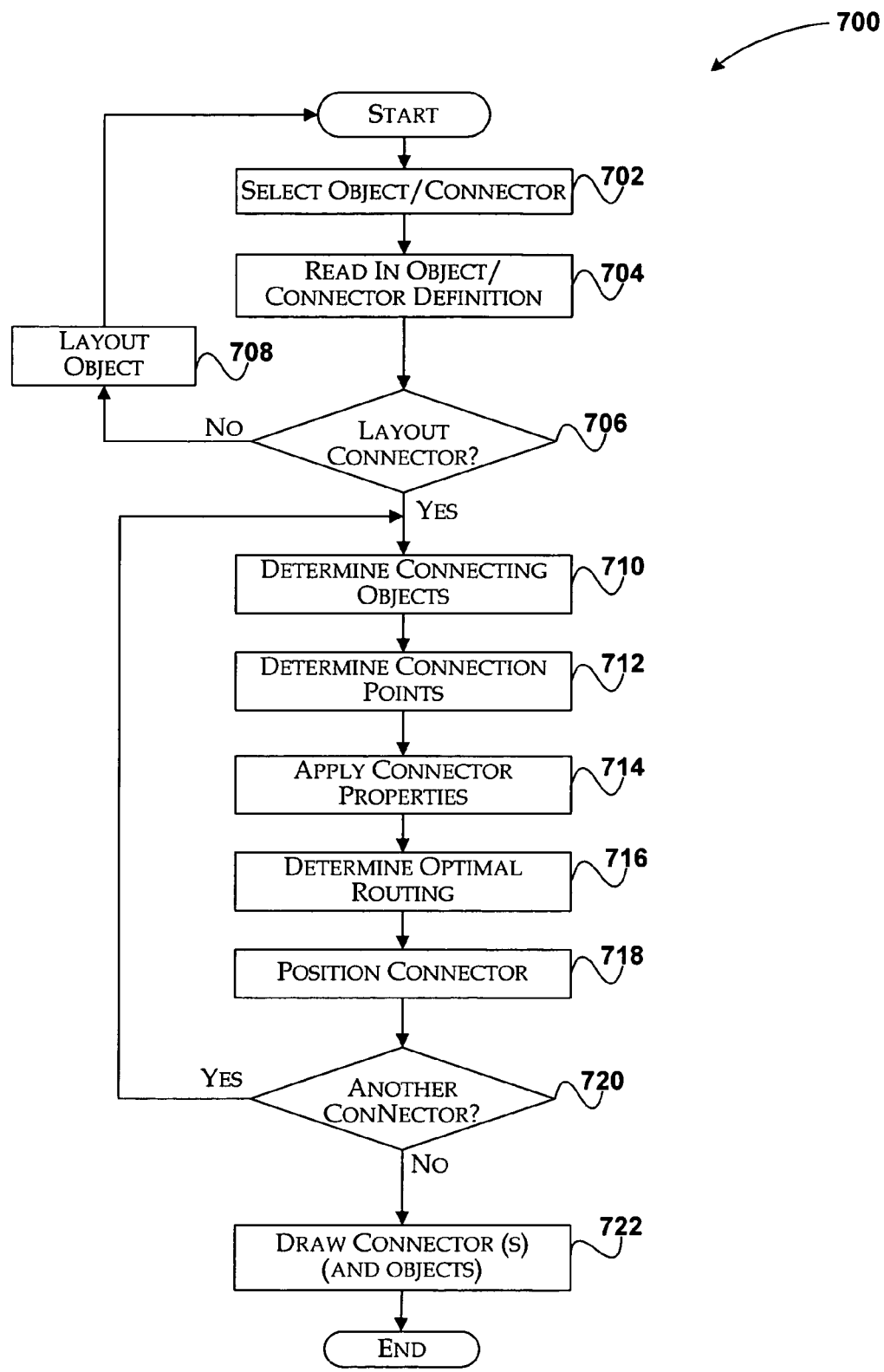
FIG. 7 is a logic flow diagram illustrating a process for providing connectors in a connected diagram.

FIG. 7 is a logic flow diagram illustrating process 700 for providing connectors in a connected diagram. Process 700 may be implemented in a diagram application such as diagram application 120 of FIG. 1.

Process 700 is an example embodiment for illustration purposes. The invention is not limited to the flowchart blocks or the order of blocks of process 700. Other embodiments of the present invention may be implemented in another process with fewer or additional blocks and in other orders without departing from the scope and spirit of the invention.

Process 700 starts at block 702 where an object is selected to represent an element of connected diagram. The object may be included in a diagram definition. In one embodiment, the user may select the object from an object database using a drop-down menu, a separate window, a pop-up window, and the like. From block 702, processing advances to block 704.

At block 704 an object and/or connector definition is read in. Object/connector definition may include properties such as dimensions, background and/or border color, appearance-related properties (3D appearance etc.), and the like. Object/connector definition may further include object/connector content. In another embodiment, the content may be provided by the user. Next, processing moves to decision block 706.

At decision block 706, a determination is made whether a connector is to be laid out. If the decision is negative, processing moves to block 708, else processing proceeds to block 710. At block 708, actions associated with laying out an object are performed and processing returns to block 702 for selection of another object/connector.

At block 710, connecting objects are determined. In a basic mode of operation, a connector may be placed between two objects. However, the invention is not so limited. Other methods of connection such as radial connection of a group of objects and multiple connections between two or more objects may also be provided. Processing moves to block 712 from block 710.

At block 712, connection points on objects to be connected are determined. As discussed previously, connection points may be determined based on different routing methods. In a fixed routing method, cardinal connection points, which are fixed points on each object, may be used for connecting beginning and end points (or edges) of the connector. In an auto routing method, an imaginary line is drawn between center points of the connecting objects. Connection points are determined as intersection points of the imaginary line and the objects' outer edges. Finally, using a radial routing method, an imaginary circle that passes through the center points of the connecting objects is drawn. Connection points are intersection points of the imaginary circle and the objects' outer edges. Processing then advances to block 714.

At block 714, connector properties are applied. Connector properties may be retrieved from a separate database or be stored along with connector definitions such as in an XML definition file. In one embodiment, application of connector properties may include a number of steps. Some of those steps are illustrated in process 800 of FIG. 8. Processing then moves to block 716.

At block 716, optimal routing for the connector is determined. Optimal routing may be determined based on a number of predetermined rules such as layout rules 206 of FIG. 2. In one embodiment, a plurality of rules may be employed according to a default prioritization or a user-determined prioritization. Some exemplary rules are: shortest path, best fit of connectors, best fit of objects, and the like. Processing moves from 716 to block 718.

At block 718, the connector is positioned. Positioning of the connector may include repositioning and resizing of existing connectors and/or objects on the canvas. A diagram application according to one embodiment is arranged to lay out a connector based on a global perspective that includes sizing and positioning all objects and connectors on the canvas in an aesthetically pleasing manner. Following block 718, where the connector is positioned, processing moves to decision block 720.

At decision block 720, a determination is made whether another connector is to be laid out. If the decision is affirmative, processing moves back to block 720. Otherwise, processing advances to block 722.

At block 722, the connector is drawn on the canvas along with other resized and repositioned objects and connectors if any. After block 722, processing moves to calling process for further actions.

Figure 8:
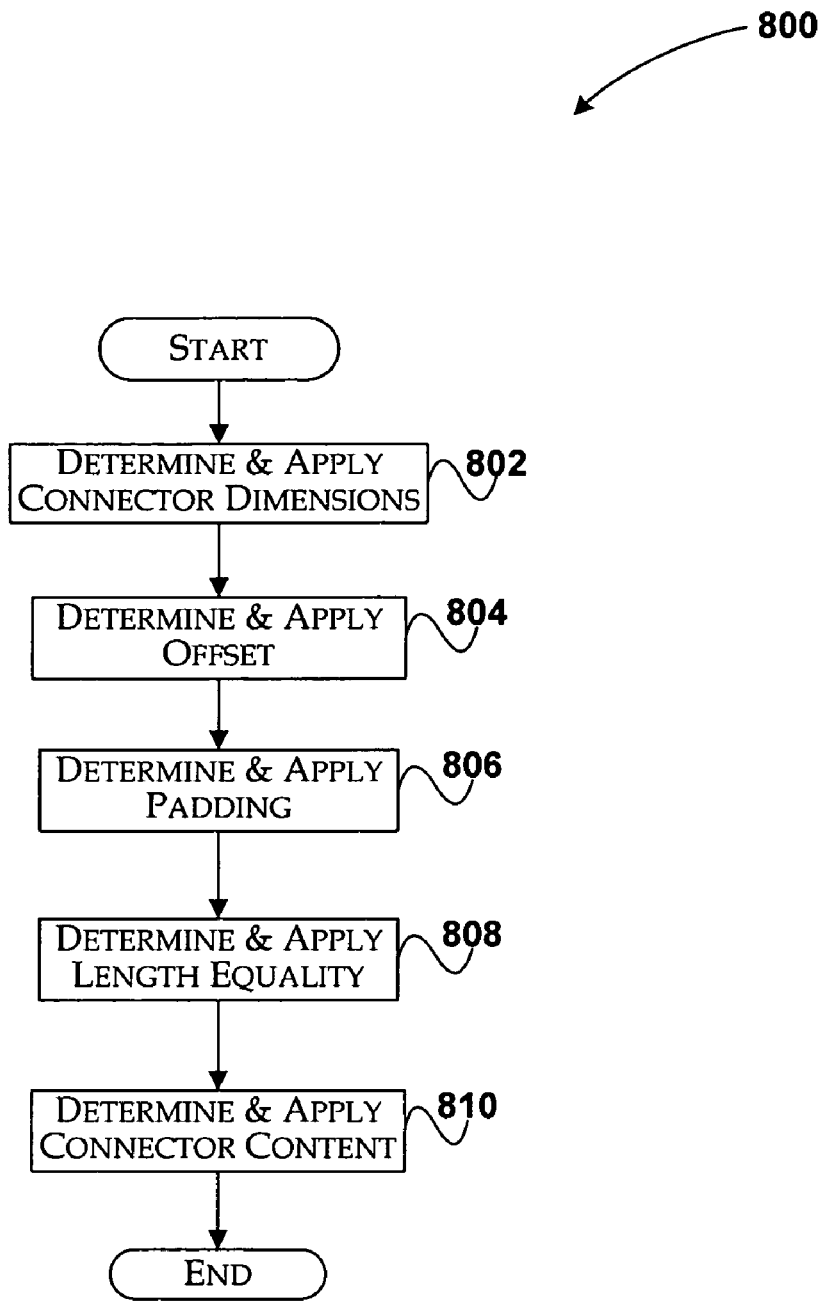
FIG. 8 is a logic flow diagram illustrating a process for applying connector properties in a connected diagram.

FIG. 8 is a logic flow diagram illustrating process 800 for applying connector properties in a connected diagram. As mentioned above, process 800 may be implemented in a diagram application as part of a connector placement algorithm such as block 716 of process 700 in FIG. 7.

Process 800 begins at block 802 where connector dimensions are determined and applied. Connector dimensions may be determined through a vector calculation based on the optimal routing of the connectors between connection points. Processing then advances to block 804.

At block 804, an offset is determined and applied to the connector. The offset may be determined automatically by the positioning of text within an object or provided by the user. Processing next moved to block 806.

At block 806, padding is determined and applied for the connector. Padding may also be retrieved from a default value list and modified by the user. From block 806, processing proceeds to block 808.

At block 808, length equality is determined and applied if that option is selected by the user. Length equality provides for alignment of a group of connectors with equal length and/or equal distance from a source object or target object.

At following block 810, connector content is determined and applied. Positioning and shaping of text boxes in association with 1D and 2D connectors is discussed previously. The text to be placed on or near the connector may be provided by the user, or selected from a default content database. Processing then returns to process 700 for further actions associated with placement of the connector.

The blocks included in process 800 are for illustration purposes. A connector may be applied by a similar process with fewer or additional steps including customization of other features of the connector without departing from the spirit and scope of the invention.

Figure 9A:
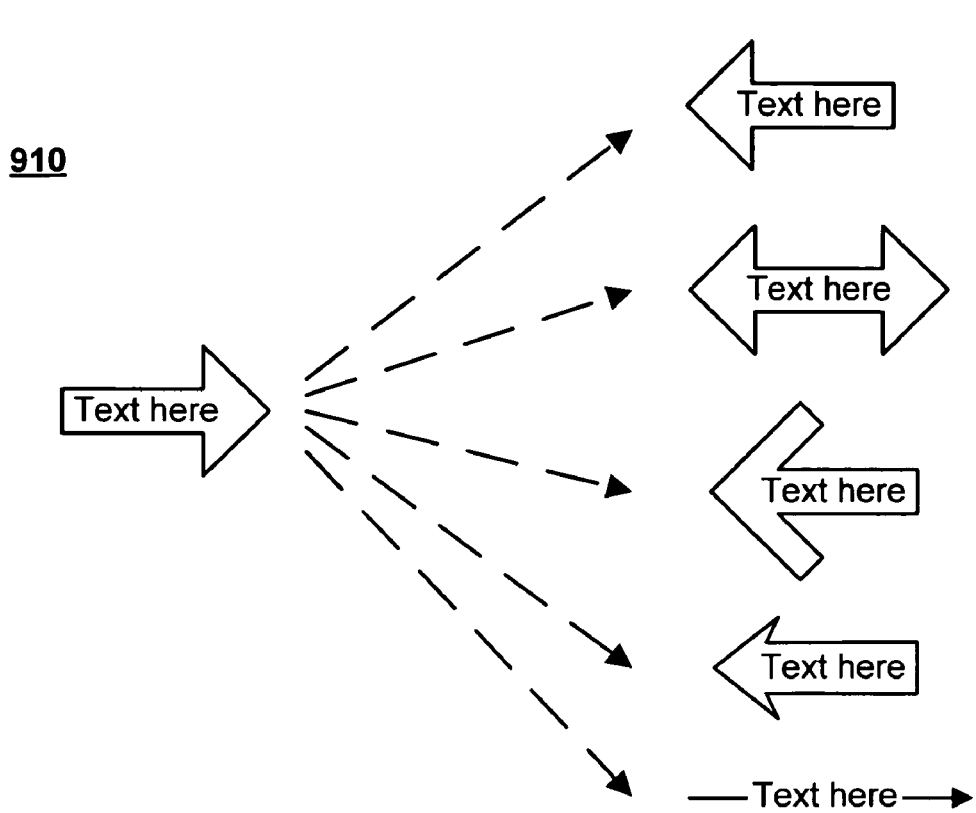
FIG. 9A illustrates various examples of 2D connector shape changes with their associated text.

FIG. 9A illustrates various examples of 2D connector shape changes with their associated text. A basic 2D connector may be an arrow with associated text placed inside the arrow. A connected diagram application according to embodiments may dynamically modify a stem length and width, an end-shape, and a size of the end-shape as illustrated.

Certain characteristics of the text such as margins, direction, offset, and the like may be modified accordingly, when the connector is changed. For example, upon changing the connector from a right-pointing arrow to a left-pointing arrow, the application may automatically modify text justification from left-justified to right-justified.

Changes to the 2D connectors may be performed when a relationship between the objects of the connected diagram is modified by the user. For example, inserting a new member, removing an existing member, or changing the hierarchy of a member in an organization chart may result in one of the changes describe above. Properties of content such as its margins, size, justification, and the like, are included in diagram definition, and are adjusted when a stem length, stem width, direction of a 2D connector are modified. Moreover, content properties may also be preserved by the application when the 2D connector is converted to a corresponding 1D connector (as shown in the figure) by user action.

Figure 9B:
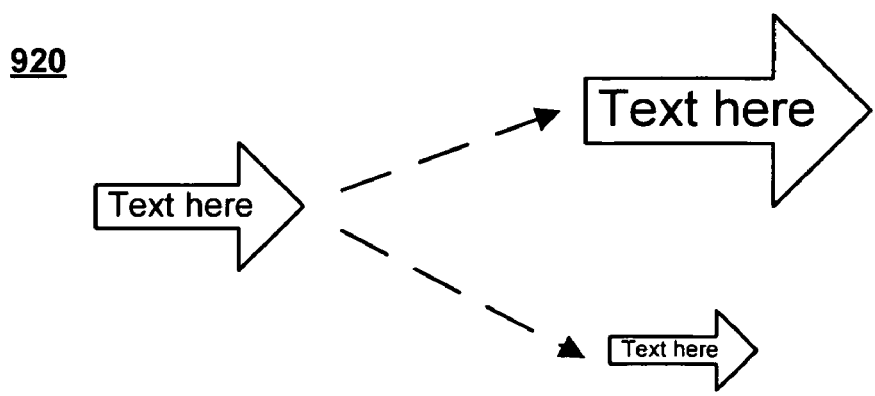
FIG. 9B illustrates examples of dynamic text adjustment in 2D connectors.

FIG. 9B illustrates diagram 920 of dynamic changing of text characteristics as the 2D connector is modified. Text size and margins are examples of text characteristics stored in diagram definition that may be adjusted as the connector is modified. If the connector is enlarged, text size may be enlarged accordingly. If the connector is reduced, text size may be reduced accordingly. Along with the text size, however, text margins may also be reduced allowing the text size to remain larger in some cases.

FIG. 9C illustrates examples of dynamic content adjustment in 2D connectors. As stated previously, images, graphics, and the like may be placed in or about the connector in addition to text. Diagram 930 shows enlargement, reduction, and direction change of an image that is used as content for the 2D arrow-shaped connector.

While arrow-shaped 2D connectors are used to illustrate example behavior, aspects are not so limited. Many other shapes of 1D and 2D connectors including curved or elbow-shaped connectors may be implemented according to embodiments. Furthermore, the text box may be placed above, under, or on top of the connector. A predetermined offset from the center position may be provided based on user selection.

Figure 10A:
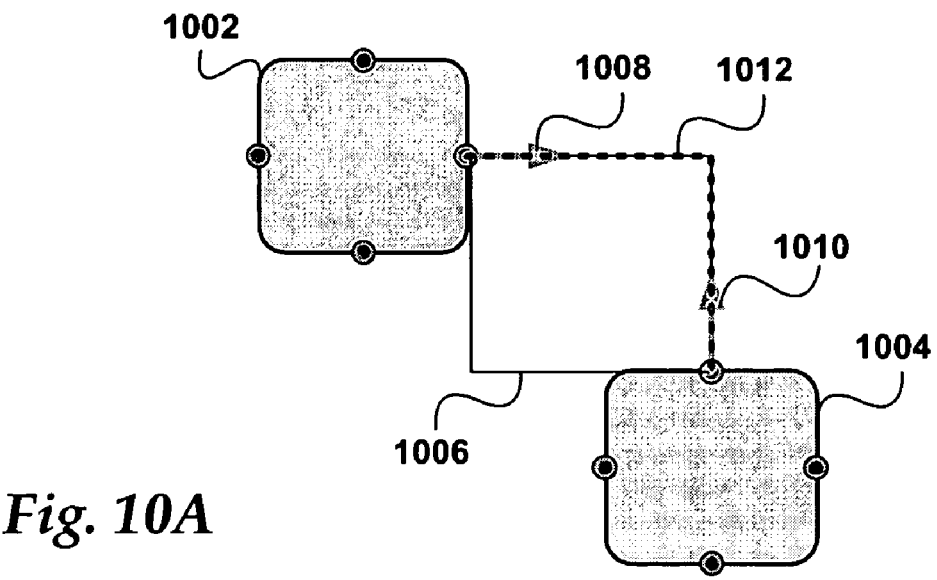
FIGS. 10A and 10B illustrate examples of connector routing between two objects according to embodiments.

FIG. 10A illustrates an example routing of a connector between two objects. A path and a shape of the connector are determined employing an imaginary boundary box with cardinal points.

Cardinal points are specified in the diagram definition for each object and determine connection points for a connector between two objects. Connectors may be laid out between two cardinal points in a variety of ways, however.

According to one embodiment, boundary box 1006 is placed between objects 1002 and 1004 such that opposing corners of boundary box 1006 coincide with selected (e.g. closest) cardinal points of the objects. Boundary box 1006 is an imaginary box that is employed to determine a path of the connector between the selected cardinal points. Two imaginary vectors 1008 and 1010 are then placed such that they originate from the cardinal points and point away from each object.

A relationship of the directions of imaginary vectors 1008 and 1010 determines the path of the connector represented by dashed line 1012 in the figure. In the example diagram of FIG. 10A, imaginary vectors 1008 and 1010 have a 90-degree angle pointing to the same general direction. This results in the far edges of boundary box 1006 being selected for the path of connector 1012.

Figure 10B:
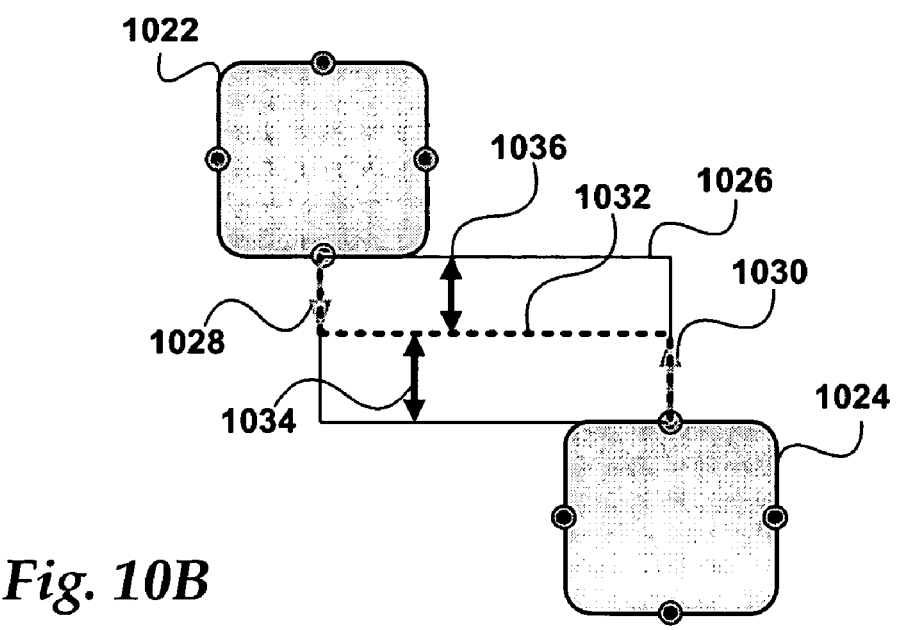

FIG. 10B illustrates another example routing of a connector between two objects. The path and the shape of the connector are again determined employing an imaginary boundary box.

Boundary box 1026 is placed between objects 1022 and 1024 such that opposing corners of boundary box 1026 coincide with selected (e.g. closest) cardinal points of the objects. Imaginary vectors 1028 and 1030 are again placed such that they originate from the cardinal points and point away from each object.

In this example, imaginary vectors 1028 and 1030 point in opposing directions (180-degree angle). This results in selection of a path for connector 1032 within boundary box 1026 in an elbow shape. Two segments of connector 1032 coincide with imaginary vectors 1028 and 1030. These segments are coupled together by a middle segment parallel to the edges of boundary box 1026 and at 90-degree angle with the imaginary vectors.

Distance parameters 1034 and 1036 determine a placement of the middle segment of connector 1032 in boundary box 1026. In one embodiment, the placement of the middle segment may be determined by a default value for distance parameter 1034, by a default value for distance parameter 1036, or by a user selection.

Figure 11A:
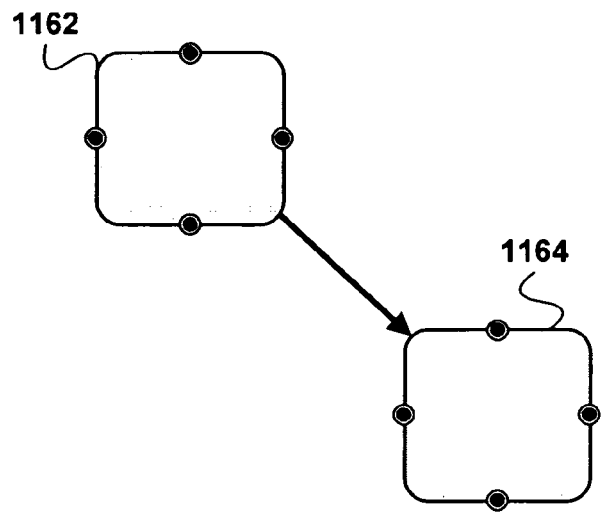
FIG. 11A illustrates an example of shortest path connection between two objects.

FIG. 11A illustrates an example of shortest path connection between two objects. Objects 1162 and 1164 have four cardinal points each for connection. A connected diagram application may ignore the cardinal points and select as connection points intersection points between an imaginary line representing the shortest path between the objects and boundaries of each object (1162, 1164).

In another embodiment, the imaginary line may be a line that represents the shortest path between the center points of objects 1162 and 1164. Once the connection points are determined, a connector defined by default parameters or by user selection is placed between them.

Figure 11B:
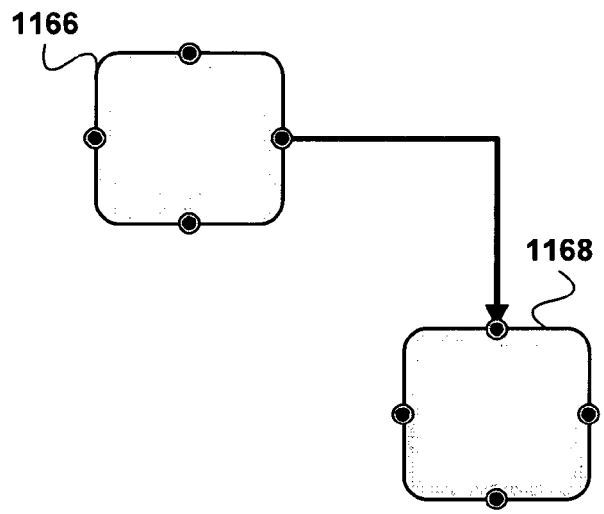
FIG. 11B illustrates an example of cardinal point connection between two objects.

FIG. 11B illustrates an example of cardinal point connection between two objects. Objects 1166 and 1168 are similar to object 1162 and 1164 of FIG. 11A, and have four cardinal points each. The connected diagram application first determines the closest cardinal points to be connected. Then a layout of the connector is determined as described above in conjunction with FIGS. 10A-10C. Finally the selected connector is placed between the cardinal points.

Figure 11C:
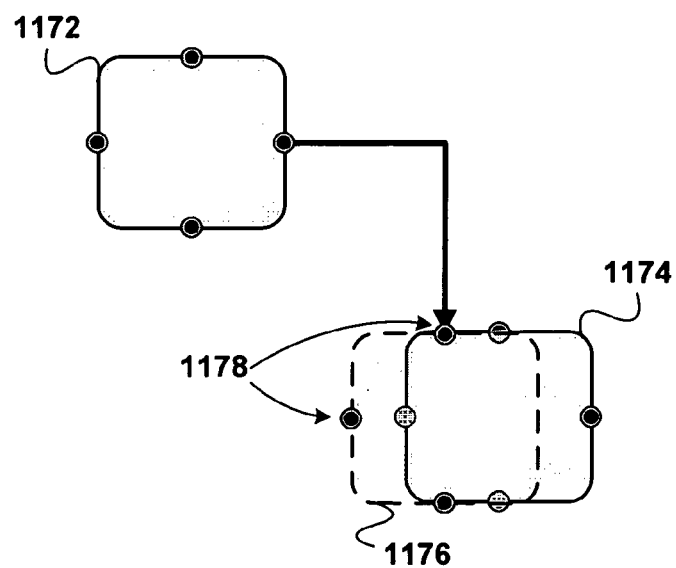
FIG. 11C illustrates an example of generating additional cardinal points for connection between two objects.

FIG. 11C illustrates an example of generating additional cardinal points for connection between objects. In addition to default cardinal points on an object, further points may be generated on the boundary or about the boundary of the original object.

A virtual object (1176) with its own default cardinal points may be placed about one of the objects (object 1174) such that cardinal points 1178 of virtual object 1176 for additional cardinal points for original object 1174. The connector between objects 1172 and 1174 is then routed similar to the process described above, but virtual object 1176's cardinal points are used to determine one connection point for the connector.

Virtual object 1176 may be placed about object 1174 based on default parameters or user selection. While the figure shows object 1174 and virtual object 1176 having similar shapes and cardinal points, embodiments are not so limited. Both objects may have any shape and number of cardinal points defined by the connected diagram application or the user, and the objects may be independent from each other.

For example, a regularly shaped (rectangle, circle, etc.) virtual object may be employed to determine cardinal points around the boundary of an irregularly shaped object such as a cloud.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method for automatically providing a connector in a diagram, comprising:
   determining connection points associated with objects to be connected;
   placing the connector between the connection points, wherein a shape and a position of the connector is determined based on routing the connector using an imaginary boundary box and a position and origination of two imaginary vectors on the imaginary boundary box relative to each other;
   applying at least one property associated with the connector;
   assigning a padding value to each of the connection points of the connector;
   associating one of a user defined and a default content with the connector; and
   providing a graphical output that includes the connector to one of a display device, a printer, and a storage device.

2. The method of claim 1, wherein placing the connector between the connection points includes:
   placing two imaginary vectors originating at the connection points and pointing away from the objects;
   placing the imaginary boundary box between the objects such that opposing corners of the imaginary boundary box coincide with the connection points when the imaginary vectors are at least substantially vertical to each other and point to a same general direction; and routing the connector along far edges of the imaginary boundary box.

3. The method of claim 1, wherein placing the connector between the connection points includes:
placing two imaginary vectors originating at the connection points and pointing away from the objects;
placing the imaginary boundary box between the objects such that adjacent corners of the imaginary boundary box coincide with the connection points when the imaginary vectors are at least substantially parallel to each other and point to a same general direction; and
routing the connector such that a first and a second segment of the connector coincide with the imaginary vectors, and a middle segment of the connector coupling the first and second segments is parallel to a far edge of the imaginary boundary box.

4. The method of claim 3, wherein a distance between the middle segment of the connector and the far edge of the imaginary boundary box is determined by a distance parameter that is defined by one of a default value and a user selection.

5. The method of claim 1, wherein placing the connector between the connection points includes:
placing two imaginary vectors originating at the connection points and pointing away from the objects;
placing the imaginary boundary box between the objects such that opposing corners of the imaginary boundary box coincide with the connection points when the imaginary vectors are at least substantially parallel to each other and point to opposite directions; and
routing the connector such that a first and a second segment of the connector coincide with the imaginary vectors, and a middle segment of the connector coupling the first and second segments is vertical to the first and second segments inside the imaginary boundary box.

6. The method of claim 5, wherein a distance between the middle segment of the connector and an edge of the imaginary boundary box parallel to the middle segment is determined by another distance parameter that is defined by one of a default value and a user selection.

7. The method of claim 1, further comprising dynamically modifying one of a shape, a size, and an end-shape of a 2D connector in response to one of a placement of a new object, removal of an existing object, and user-prompted change of a relationship between existing objects.

8. The method of claim 1, further comprising preserving a property of connector content when a 2D connector is switched to a 1D connector in response a user selection.

9. The method of claim 1, wherein placing the connector between the connection points includes at least one of:
placing the connector between two cardinal points on the two objects;
placing the connector between two intersection points of an imaginary line connecting center points of the two objects and two closest borders of the two objects; and
placing the connector between two intersection points of an imaginary line between the two objects and two closest borders of the two objects.

10. The method of claim 9, wherein placing the connector between the connection points further includes:
placing a virtual object in a predetermined location about a first object, wherein the predetermined location is defined by a default parameter; and
placing the connector between a cardinal point of a second object and a cardinal point of the virtual object.

11. The method of claim 10, wherein the virtual object has a shape that is different from the first object.

12. The method of claim 1, wherein at least one of a text size, a text margin, an image size, and an image margin of the connector is adjusted automatically based on a distance between the connection points.

13. The method of claim 1, wherein placing the connector between the connection points for a 1D connector includes circumventing a text box that contains the content such that the text box blends with a canvas.

14. The method of claim 1, wherein placing the connector between the connection points includes placing a straight connector on a circular path between the objects to be connected.

15. A computer-readable storage medium encoded with computer instructions for providing a connector in a diagram, the instructions comprising:
determining connection points associated with objects to be connected;
placing the connector between the connection points by:
placing two imaginary vectors originating at the connection points and pointing away from the objects; and
placing an imaginary boundary box between the objects such that opposing corners of the imaginary boundary box coincide with the connection points when the imaginary vectors are at least substantially vertical to each other and point to a same general direction, and routing the connector along the far edges of the imaginary boundary box; and
assigning a padding value to each of the connection points of the connector; associating one of a user defined and a default content with the connector; and
providing a graphical output that includes the connector to one of a display device, a printer, and a storage device.

16. The computer-readable storage medium of claim 15, wherein placing the connector between the connection points further includes placing the imaginary boundary box between the objects such that opposing corners of the imaginary boundary box coincide with the connection points when the imaginary vectors are at least substantially parallel to each other and point to opposite directions, and routing the connector such that a first and a second segment of the connector coincide with the imaginary vectors, and a middle segment of the connector coupling the first and second segments is vertical to the first and second segments inside the imaginary boundary box.

17. The computer-readable storage medium of claim 15, wherein the instructions further comprise dynamically modifying one of a shape, a size, an end-shape, a content size, and a content margin of a 2D connector in response to one of a placement of a new object, removal of an existing object, and user-prompted change of a relationship between existing objects.

18. The computer-readable storage medium of claim 15, wherein the instructions further comprise generating additional cardinal points on an object by placing a virtual object in a predetermined location about a first object, wherein the predetermined location is defined by a default parameter; and using the cardinal points of the virtual object as one of the connection points.

19. A system for providing a connector in a diagram, comprising:
an application that is arranged to lay out objects and route connectors between the objects, wherein the application is arranged to:
determine connection points associated with the objects to be connected;
place the connector between the connection points employing two imaginary vectors originating at the connection points and pointing away from the objects, and an imaginary boundary box whose two corners coincide with the connection points, wherein the connector is routed along one of: far edges of the imaginary boundary box and along a segment line inside the imaginary boundary box;

assign a padding value to each of the connection points of the connector; and associate content with the connector;

at least one database that includes default information associated with at least one of an object definition, an object property, a connector definition, a connector property, and a layout rule; and a user interface that is arranged to provide a user with an opportunity to modify at least one of the object definition, the object property, the connector definition, the connector property, and the layout rule.

20. The system of claim 19, wherein the application is further arranged to:

dynamically modify one of a shape, a size, an end-shape, a content size, and a content margin of a 2D connector in response to one of a placement of a new object, removal of an existing object, and user-prompted change of a relationship between existing objects.

* * * * *